United States Patent [19]
Underwood

[11] Patent Number: 6,074,679
[45] Date of Patent: Jun. 13, 2000

[54] STABILIZED LIQUID SMOKE COMPOSITIONS AND METHODS OF MANUFACTURING THE SAME

[75] Inventor: Gary L. Underwood, Manitowoc, Wis.

[73] Assignee: Red Arrow Products Company LLC, Manitowoc, Wis.

[21] Appl. No.: 09/033,620

[22] Filed: Mar. 5, 1998

[51] Int. Cl.[7] ............................. A22C 13/00; A23L 1/232
[52] U.S. Cl. ......................... 426/135; 426/138; 426/140; 426/314; 426/330; 426/533; 426/650; 426/250; 426/540
[58] Field of Search ................... 426/250, 540, 426/135, 138, 140, 314, 330, 533, 650

[56] References Cited

U.S. PATENT DOCUMENTS

| | | | |
|---|---|---|---|
| 3,106,473 | 10/1963 | Hollenbeck | 99/229 |
| 4,104,408 | 8/1978 | Chiu | 426/135 |
| 4,278,694 | 7/1981 | Chiu | 426/135 |
| 4,431,033 | 2/1984 | Nicholson | 138/118.1 |
| 4,504,507 | 3/1985 | Nicholson et al. | 426/533 |
| 4,511,613 | 4/1985 | Nicholson et al. | 428/36 |
| 4,525,397 | 6/1985 | Chiu | 428/36 |
| 4,592,918 | 6/1986 | Chiu | 426/533 |
| 4,604,309 | 8/1986 | Goldberg | 428/36 |
| 4,751,097 | 6/1988 | Melcer | 426/650 |
| 4,876,108 | 10/1989 | Underwood et al. | 426/650 |
| 4,877,626 | 10/1989 | Ande | 426/250 |
| 4,883,676 | 11/1989 | Sophianopoulos et al. | 426/314 |
| 4,933,217 | 6/1990 | Chiu | 428/34.8 |
| 5,230,933 | 7/1993 | Apfeld et al. | 428/34.8 |
| 5,397,582 | 3/1995 | Underwood et al. | 426/250 |
| 5,637,339 | 6/1997 | Moeller | 426/422 |
| 5,681,603 | 10/1997 | Underwood | 426/271 |
| 5,690,977 | 11/1997 | Hammer et al. | 426/105 |

*Primary Examiner*—Cynthia L. Nessler
*Attorney, Agent, or Firm*—Marshall, O'Toole, Gerstein, Murray & Borun

[57] ABSTRACT

Stabilized, dilutable liquid smoke compositions are disclosed. The stabilized liquid smoke compositions contain a liquid smoke composition, an inorganic salt, and, optionally, an inorganic mineral acid, preferably phosphoric acid, such that the weight ratio of organic compounds to inorganic compounds is sufficient to provide an initial % T at 590 nm of at least about 95.5%. The stabilized liquid smoke compositions are essentially free of dissolved tar, and, therefore, are water dilutable without forming a tar precipitate.

20 Claims, 1 Drawing Sheet

STABILIZED LIQUID SMOKE COMPOSITIONS AND METHODS OF MANUFACTURING THE SAME

FIELD OF THE INVENTION

The present invention relates to stabilized liquid smoke compositions, and in particular to stabilized liquid smoke compositions prepared from the pyrolysis of wood. The stabilized liquid smoke compositions are essentially free of dissolved tar, and, therefore: (a) do not become dark in color during storage, and (b) can be diluted with water without forming a tar precipitate. In particular, the present invention relates to stabilized, nonfoaming liquid smoke compositions containing a liquid smoke composition, an inorganic salt, and, in preferred embodiments, an inorganic mineral acid, like phosphoric acid. The stabilized liquid smoke compositions have a total organic content of about 8% to about 30% by weight, a weight ratio of organic compounds to inorganic compounds sufficient to provide an initial percent light transmittance (% T) at 590 nm of at least about 95.5%, and a % T at 590 nm after 8 weeks of storage at 32° C. of at least about 92%.

BACKGROUND OF THE INVENTION

Using a liquid smoke composition as a replacement for smoking food by direct contact with wood smoke has become a standard industry practice. When applied to the surface of meats and other proteinaceous foodstuffs, a liquid smoke composition imparts a characteristic smoke flavor and a dark smoked color to a foodstuff. The preparation of a smokehouse-like foodstuff by applying an aqueous liquid smoke composition to a foodstuff requires controlling and balancing many related variables, such as the foodstuff composition, temperature, humidity, process and contact time, and amount and concentration of applied liquid smoke composition.

Wood smoke itself is a complex and variable mixture of compounds produced during wood pyrolysis, and includes numerous vaporous compounds which are liquids at room temperature. Pyrolysis is a general term for the thermal decomposition of an organic material, such as wood, plants, and fossil fuels, either during combustion or by rapid heating in an oxygen-deleted atmosphere. Pyrolysis with combustion uses the oxidation or burning of a portion of the organic material to provide the thermal energy required to vaporize and decompose the remainder of the organic material. For pyrolysis without combustion, thermal energy is supplied indirectly from an external source, such as radiation, solid or gaseous heat carriers, or thermal conduction through reactor walls. The energy supplied by an external source vaporizes and decomposes the organic material without directly burning the organic material.

One commercial liquid smoke preparation is the aqueous liquid smoke composition described in Hollenbeck U.S. Pat. No. 3,106,473. This composition is produced by partial combustion of hardwood sawdust with limited access to air, followed by collecting the desirable smoke constituents in water. A heavy, water-insoluble phase, which contains tar, polymers, polycyclic aromatic hydrocarbons, waxes, and other undesirable products unsuitable for use in food applications is discarded. This type of composition is termed a "slow pyrolysis" liquid smoke composition.

Another commercial liquid smoke preparation is disclosed in Underwood et al. U.S. Pat. No. 4,876,108. This composition is produced by rapidly heating ground wood or cellulose in an oxygen-starved atmosphere, and collecting the water-soluble pyrolysis products. This type of composition is termed a "fast pyrolysis" liquid smoke composition. Like a slow pyrolysis composition, a fast pyrolysis composition contains tar, polymers, and hydrocarbons that must be separated and discarded.

Both methods of pyrolysis produce liquids (i.e., condensable vapors), gases (i.e., noncondensable vapors), and solids (i.e., char and ash) in varying proportions depending upon feed material and pyrolysis conditions. The condensed liquids are further subdivided into water-soluble organic compounds and water-insoluble tars. It is known that the desirable active ingredients for flavoring and coloring foodstuffs are present in the water-soluble condensed liquids. The water-insoluble tars have been considered a by-product of wood pyrolysis that are of little to no value, and typically are discarded.

While there are hundreds of different chemical species present in liquid smoke compositions, the useful water-soluble components of a liquid smoke composition generally are divided into classes based on compounds having distinct functional groups. These classes are acids, carbonyls, phenolics, and basic and neutral constituents. In general, phenolics are the primary flavoring compounds, carbonyls are the primary coloring compounds, and acids are primarily preservatives and pH controlling agents. The acids and carbonyls also make a secondary contribution to flavor and enhance the surface characteristics of smoked foodstuffs. The acids are predominantly $C_1$–$C_4$ carboxylic acids, and mainly acetic acid. Acids are measured as titratable acidity calculated as percent acetic acid, by weight.

For commercial aqueous liquid smoke compositions, production begins with smoke generated by the combustion and/or pyrolysis of wood as discussed above. After pyrolysis, the smoke is collected, and, can be fed through a column countercurrent to a flow of recirculating water. Alternatively, smoke components can be condensed directly to form a liquid, then water is added to the condensed smoke components. Dilution of condensable smoke components with water by either method results in the separation of undesirable tars, polymers, and other water-insoluble components from the desirable liquid smoke components.

In the preparation of a commercial liquid smoke composition, additional water-insoluble tars separate from the liquid smoke composition while the liquid smoke composition is held in storage. Water-insoluble hydrocarbons, like polynuclear aromatic compounds, are unavoidable contaminants associated with the pyrolysis of wood, and settle out of the liquid smoke composition with the tar. The hydrocarbons, like the tar, are physically separated from the liquid smoke composition. The water-insoluble tar then is discarded.

However, due to the presence of organic compounds in the liquid smoke composition, the tars and hydrocarbons do not completely settle out of the composition. If the organic compound content of the liquid smoke solution is low, some tar is dispersed, or suspended, in the liquid smoke composition. As the organic compound concentration of the liquid smoke composition increases, a portion of the tar actually can be dissolved in the liquid smoke composition. Removing the dissolved tar and hydrocarbons has been difficult to impossible to achieve, especially because tar is continually formed from monomeric tar precursors during storage of the liquid smoke composition.

Attempts have been made to remove dissolved tar from a liquid smoke composition by preparing a tar-depleted liquid smoke composition. It should be understood that a tar-depleted liquid smoke composition is not essentially free of dissolved tars. Dissolved tar is present in a tar-depleted liquid smoke composition because a portion is solubilized in, or dispersed by, the organic components of the liquid smoke composition, and because a portion of new tar, which is formed over time, is dissolved in the composition.

One type of tar-depleted liquid smoke composition is disclosed in Nicholson U.S. Pat. No. 4,431,033. These tar-depleted liquid smoke compositions are prepared by contacting a liquid smoke composition with a water-insoluble organic solvent, like methylene chloride, to extract dissolved tar from the aqueous composition. The resulting tar-depleted liquid smoke composition has an absorptive power of at least 0.25 at 340 nm (nanometers).

Another type of tar-depleted liquid smoke composition is disclosed in Chiu U.S. Pat. No. 4,592,918. These liquid smoke compositions have an absorptive power of at least about 0.25 at 340 nm, and a percent light transmittance (% T) at 590 nm of at least about 50%. The tar-depleted liquid smoke is prepared by partially neutralizing a liquid smoke composition to a pH above 4 to precipitate dissolved tars, or by extracting dissolved tar from the liquid smoke composition with a nonpolar solvent.

Moeller U.S. Pat. No. 5,637,339 also discloses a tar-depleted liquid smoke prepared by contacting the liquid smoke with activated charcoal.

Although the above-described disclosures teach how to reduce dissolved tar content, the goal of a liquid smoke composition that is essentially free of dissolved tar has not been achieved. The tar-depleted liquid smoke compositions prepared by the above-discussed methods typically are stored under refrigeration to retard formation of dissolved tar which darkens the composition and yields a water-insoluble tar precipitate after dilution with water. The water-insoluble tar precipitate is often observed as turbidity when the liquid smoke composition is diluted with water. Therefore, the tar and tar precursors remaining in the above-described tar-depleted liquid smoke compositions pose continued problems to users of liquid smoke compositions.

In particular, the water-insoluble tars that form during storage of a liquid smoke composition or a tar-depleted liquid smoke compositions are intractable, high viscosity liquids or semisolids. Such tars precipitate to the bottom of storage containers, or cling to the sides of the container, and therefore, pose no problem when the liquid smoke composition is removed from the container for use.

However, dissolved tars do pose a problem. In many applications, the liquid smoke composition is diluted with water before application to a foodstuff, like a meat or a casing. Water dilution reduces the concentration of organic compounds, and the diluted liquid smoke composition no longer has sufficient dispersing or solvating properties to maintain the dissolved tars in suspension or solution. Accordingly, a fine tar precipitate forms in the diluted liquid smoke composition and the diluted liquid smoke composition has a turbid appearance.

The fine tar precipitate may or may not adversely affect the foodstuff being treated with the diluted liquid smoke. However, the fine tar precipitate does adversely affect application equipment, like clogging spray nozzles and filters, and building up on casing peelers to reduce productivity.

The present invention is directed to stabilized liquid smoke compositions that overcome the problems associated with prior liquid smoke compositions, and with prior tar-depleted liquid smoke compositions, by eliminating the formation of dissolved tars during storage.

SUMMARY OF THE INVENTION

The present invention relates to stabilized liquid smoke compositions prepared from liquid smoke compositions, either the slow pyrolysis type or the fast pyrolysis type. The stabilized liquid smoke compositions do not form dissolved tars during storage and do not form a tar precipitate after dilution with water, thereby overcoming the problems associated with prior liquid smoke compositions and prior tar-depleted liquid smoke compositions.

The present stabilized liquid smoke compositions comprise: (a) a liquid smoke composition derived from the pyrolysis of wood; (b) an inorganic salt; and, optionally, (c) an inorganic mineral acid, preferably phosphoric acid. In accordance with one important aspect of the present invention, the weight ratio of organic compounds to inorganic compounds in a stabilized liquid smoke composition is sufficient to provide an initial % T at 590 nm of at least about 95.5%.

Another aspect of the present invention is to provide a stabilized liquid smoke composition having an initial % T at 590 nm of about 95.5% or greater and that satisfies the relationship:

$$\log (\text{org/inorg}) \leq -0.23x + 0.85,$$

wherein org/inorg is the weight ratio of organic compounds to inorganic compounds in the composition and x is the percent of organic compounds, expressed as a product of the volume % of the liquid smoke composition and Brix of the liquid smoke composition, in the composition.

In accordance with another important aspect of the present invention, the stabilized liquid smoke compositions contain about 8% to about 30% by weight, and preferably about 10% to about 25% by weight, organic compounds.

Yet another important aspect of the present invention is to provide a stabilized liquid smoke composition having an initial % T at 590 nm of at least about 95.5%, and a %T at 590 nm after eight (8) weeks storage at 32° C. of at least about 92%. The stabilized liquid smoke compositions preferably have an absorptive power, at 340 nm, of less than 0.25, and more preferably less than 0.20, throughout the life of the composition.

In accordance with another important aspect of the present invention, the stabilized liquid smoke compositions can be derived from a fast pyrolysis or a slow pyrolysis liquid smoke composition. The liquid smoke compositions used to prepare a stabilized liquid smoke composition have a titratable acidity (expressed as % by weight acetic acid) of about 6% to about 16%.

Another important aspect of the present invention is to provide a stabilized liquid smoke composition comprising about 30% to about 70% by volume of a liquid smoke composition, about 1% to about 10% by weight of an inorganic salt, like sodium hydroxide or sodium chloride, and 0% to about 10% by weight of an inorganic mineral acid, such that the stabilized liquid smoke composition has a total content of organic compounds of about 8% to about 30% by weight, and a weight ratio of organic compounds to inorganic compounds sufficient to provide an initial % T at 590 nm of at least about 95.5%.

Yet another important aspect of the present invention is to provide a nonfoaming, stabilized liquid smoke composition. Prior methods of preventing the formation of dissolved tars, or keeping the tars in solution, relied upon adding polysorbate to the liquid smoke composition. Polysorbates cause foaming problems, and, accordingly, an antifoam was added to the liquid smoke composition. The present stabilized liquid smoke compositions do not require a polysorbate, and accordingly, do not require an antifoam.

These and other aspects and advantages of the present invention will become apparent from the following detailed description of the preferred embodiments.

DETAILED DESCRIPTION OF THE PREFERRED EMBODIMENTS

Figure 1:
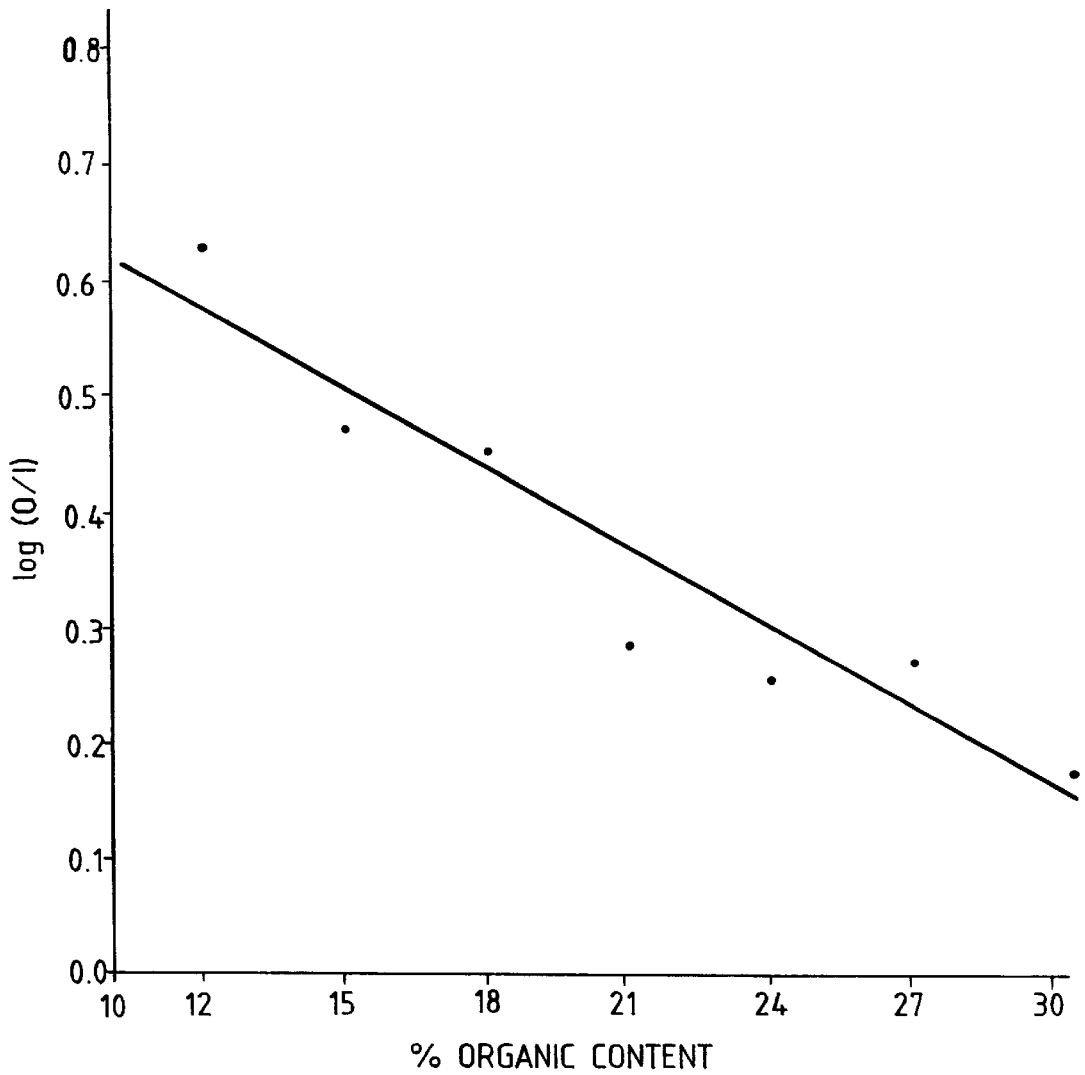
FIG. 1 is a plot of log (org/inorg) vs. % of organic compounds present in a stabilized liquid smoke composition.

The present invention is directed to stabilized liquid smoke compositions, and to their method of manufacture. The stabilized liquid smoke compositions are dilutable with water, do not form dissolved tars during storage, and do not form a tar precipitate during or after dilution. The stabilized liquid smoke compositions contain a liquid smoke composition, an inorganic salt, and, optionally, an inorganic mineral acid, preferably phosphoric acid, such that the compositions contain about 8% to about 30% by weight organic compounds, and a weight ratio of organic compounds to inorganic compounds sufficient to provide an initial % T at 590 nm of at least about 95.5%.

The stabilized liquid smoke compositions of the present invention have an initial percent light transmittance (% T) at 590 nm of at least about 95.5%, and a transmittance at 590 nm after eight weeks of storage at 32° C. of at least about 92%. In addition, preferred stabilized liquid smoke compositions of the present invention have a pH of about 2 to about 6, and a titratable acidity of about 6% to about 16%.

A liquid smoke composition used in the stabilized liquid smoke compositions can be prepared by a slow pyrolysis method or a fast pyrolysis method. The liquid smoke compositions used in the present composition and method have a sufficient concentration of organic compounds to be at least about 20 brix, like about 20 to about 50 brix, and preferably about 25 to about 50 brix. To achieve the full advantage of the present invention, the liquid smoke composition is about 30 to about 50 brix. Brix is an indication of the weight percent of soluble organic compounds in aqueous solution. While normally used in measuring the weight % of sucrose in a sugar solution, a brix value is an effective approximation of the amount of organic components in an aqueous liquid smoke composition.

The liquid smoke composition is present in a sufficient amount to provide a stabilized liquid smoke composition having about 8% to about 30%, by weight, organic compounds. Preferably, the stabilized liquid smoke compositions contain about 10% to about 25%, by weight of organic compounds. To achieve the full advantage of the present invention, the stabilized liquid smoke compositions contain about 12% to about 20%, by weight, organic compounds.

A present stabilized liquid smoke composition can contain greater than about 30% by weight organic compounds, but the amount of inorganic salt needed to stabilize the composition would be in excess of 20% by weight. This amount of inorganic salt is too high for practical use, e.g., would dehydrate meat. In addition, stabilized compositions containing less than about 8% by weight organic compounds can be prepared, but generally contain insufficient organic compounds for further dilution.

The liquid smoke composition is present in the stabilized composition in an amount of about 30% to about 70%, and preferably about 35% to about 60%, by volume of the stabilized liquid smoke composition. To achieve the full advantage of the present invention, the liquid smoke composition is present in an amount of about 40% to about 60%, by volume of the stabilized composition.

The specific amount of liquid smoke composition present in a stabilized liquid smoke composition is determined by the brix of the liquid smoke composition and by the final concentration of organic compounds desired in the stabilized liquid smoke composition. The amount of liquid smoke composition needed to provide a desired stabilized liquid smoke composition having about 8% to about 30% by weight organic compounds is readily calculated by persons skilled in the art from the brix of the liquid smoke composition.

Because the stabilized liquid smoke compositions of the present invention contain a maximum of about 30% by weight organic compounds, preferred liquid smoke compositions used in the stabilized liquid smoke compositions contain a maximum amount of organic components that impart coloring and flavor to an article treated with the stabilized liquid smoke composition. In particular, phenolics are the primary flavoring compounds, and carbonyls are the primary coloring compounds. An especially useful coloring compound is hydroxyacetaldehyde. The acids are primarily preservatives and pH controlling agents. Therefore, liquid smoke compositions containing a relatively high amount carbonyls, and a relatively low amount of acid, are preferred. Liquid smoke compositions containing a relatively high amount of hydroxyacetaldehyde are especially preferred.

The phenolics, carbonyls, and acids all contribute to the concentration of organic compounds in the composition. The acid content is expressed as weight percent (wt %) acetic acid, and basically is $C_1$–$C_4$ carboxylic acids, and predominantly acetic acid. Therefore, to provide a stabilized liquid smoke composition having a maximum of about 30% by weight organic compounds, and having optimum coloring and flavor capabilities, the stabilized liquid smoke composition has a high content of carbonyls, especially hydroxyacetaldehyde, while the acid content is minimized. A liquid smoke composition prepared by a slow pyrolysis method contains greater than 10% by weight acetic acid. A liquid smoke composition prepared by a fast pyrolysis method contains about 6.5% by weight acetic acid, and, therefore, is preferred in a stabilized liquid smoke composition of the present invention.

As illustrated in detail hereafter, it is desirable to reduce the titratable acidity (i.e., the amount of organic acids) of the liquid smoke composition. This can be accomplished by evaporatively concentrating a relatively dilute (e.g., 30 brix) liquid smoke composition to provide a relatively concentrated (e.g., 50 brix) composition. Evaporation removes a portion of the organic acids, but the browning components in the liquid smoke composition remain. Alternatively, a liquid smoke composition can be concentrated by distilling the liquid smoke composition, and separating the distillate fraction containing the organic acids from the browning fraction.

In addition, a fast pyrolysis liquid smoke composition of 30 brix contains 4% by weight, or more, of hydroxyacetaldehyde, whereas a 30 brix, slow pyrolysis liquid smoke composition contains only about 2.5% by weight hydroxyacetaldehyde. Because users of a liquid smoke composition desire a maximum browning capability, and because a stabilized liquid smoke composition contains a maximum of 30% by weight organic compounds, the fast pyrolysis liquid smoke compositions are preferred in the stabilized liquid smoke compositions.

In addition to the liquid smoke composition, a stabilized liquid smoke composition contains about 1% to about 20%, and preferably 2% to about 15%, by weight, of one or more inorganic salts. To achieve the full advantage of the present invention, the stabilized liquid smoke composition contains about 3% to about 12%, by weight, of one or more inorganic salts. As discussed hereafter, if an optional inorganic mineral acid is present in the composition, the inorganic mineral acid contributes to the amount of inorganic salts in the stabilized liquid smoke composition.

The inorganic salts stabilize the liquid smoke composition by helping achieving a weight ratio of organic compounds to inorganic compounds sufficient to provide a composition having an initial % T at 590 nm of at least about 95%. The inorganic salts also provide a stabilized liquid smoke composition that is either isotonic or hypertonic compared to meat emulsions.

The inorganic salt, or mixture of salts, present in the stabilized liquid smoke composition can be any physiologically acceptable, water-soluble salt. The cation typically is an alkali metal, but also can be an alkaline earth metal. Preferred cations are sodium and potassium. Sodium is the most preferred cation. The anion can be a halide, or an anion such as hydroxide, sulfate, bisulfate, phosphate, nitrate, or mixtures thereof, for example. Preferred anions are chloride, phosphate, hydroxide, and mixtures thereof.

In addition to the liquid smoke composition and inorganic salt, a stabilized liquid smoke composition of the present invention also can optionally contain an inorganic mineral acid. The inorganic mineral acid, and especially phosphoric acid, in conjunction with the inorganic salts, imparts additional stability to a liquid smoke composition.

An aqueous inorganic mineral acid solution can be admixed with a liquid smoke composition, or a partially neutralized inorganic mineral acid solution can be admixed with a liquid smoke composition. An inorganic mineral acid solution optionally can be neutralized to a pH of about 2 to about 2.5 with aqueous sodium hydroxide prior to adding the inorganic mineral acid to the liquid smoke composition. The inorganic mineral acid is partially neutralized to more closely match the pH of the liquid smoke solution, i.e., pH about 2 to about 2.5. Alternatively, a combination of an inorganic mineral acid and a salt of the acid, like a combination of phosphoric acid and phosphate salts, can be used to prepare a partially neutralized inorganic mineral acid solution having a pH of about 2 to about 2.5.

The stabilized liquid smoke compositions of the present invention can be neutralized further, i.e., to a pH of about 6, and particularly to a pH of about 5, without adversely affecting the stabilized liquid smoke composition. Stabilized liquid smoke compositions having a pH of about 2 to 2.5, are used in surface applications to impart a brown color to a foodstuff. A stabilized liquid smoke composition having a pH up to about 6 is used for internal applications, for example, in a meat emulsion or bacon brine injection.

In accordance with an important feature of the present invention, and as demonstrated hereafter, phosphoric acid is the preferred inorganic mineral acid used in the stabilized liquid smoke compositions. Examples of other useful acids include, but are not limited to, hydrochloric acid and sulfuric acid. Organic carboxylic acids are not useful because organic acids do not sufficiently stabilize a liquid smoke composition, and organic acids contribute to the total amount of organic compounds in the composition without providing a benefit, such as browning. The addition of an organic acid also makes it difficult to achieve the weight ratio of organic compounds to inorganic compounds necessary to provide a stabilized liquid smoke composition, i.e., an initial % T at 590 nm of at least about 95.5%.

The amount of inorganic mineral acid present in a stabilized liquid smoke composition is 0% to about 12%, and preferably about 1% to about 10%, by weight of the composition. To achieve the full advantage of the present invention, a stabilized liquid smoke composition contains about 2% to about 8%, by weight of the composition, of an inorganic mineral acid.

A stabilized liquid smoke composition of the present invention is prepared by admixing a liquid smoke composition, an inorganic salt, and an optional inorganic mineral acid. The specific amounts of these three ingredients present in the stabilized liquid smoke composition can be calculated from: (a) the brix of the liquid smoke composition, such that stabilized liquid smoke composition contains about 8% to about 30% by weight organic compounds, and (b) the weight ratio of organic compounds to inorganic compounds sufficient to provide an initial % T at 590 nm of at least about 95.5%. As disclosed hereafter, the desired weight ratio can be determined from the weight percent of organic compounds present in the stabilized liquid smoke composition because the weight percent of organic compounds is proportional to the logarithm of the organic/inorganic weight ratio.

Preferred stabilized liquid smoke compositions have a weight ratio of organic-to-inorganic compounds, i.e., (O/I ratio), such that the log (O/I ratio) is about 0.60 to about 0.15 across the total organic content range of about 8% to about 30% by weight. In other words, an O/I ratio of no greater than about 1.5 for a stabilized liquid smoke composition containing 30% by weight organic compounds to 4.5 for a stabilized liquid smoke composition containing 8% by weight organic compounds, as set forth in the plot of FIG. 1, which is described in detail hereafter.

The stabilized liquid smoke compositions of the present invention impart flavor and color to meat and other foodstuffs, and remain essentially free of dissolved tar throughout the life of the composition. In particular, a stabilized liquid smoke composition of the present invention does not form dissolved tars during storage, i.e., the % T of the composition does not substantially decrease during storage due to formation of dissolved tar. As demonstrated hereafter, a present stabilized liquid smoke composition is essentially free of dissolved tar, having an initial % T at 590 nm of at least about 95.5% (i.e., a solution of 1 volume part smoke composition and 9 volume parts water is not turbid), and a % T at 590 nm after eight weeks storage at 32° C. of at least about 92% (i.e., dilutions remain turbidity free).

The percent transmittance values exhibited by the stabilized compositions of the present invention over time show that although tar precursors are present in the composition, the precursors do not form dissolved tar. Tar formation is demonstrated by the turbidity of a liquid smoke composition, and a decrease in % T, over time and during storage. The stabilized liquid smoke compositions of the present invention therefore are different from the tar-depleted liquid smoke compositions of the prior art which form a tar precipitate when diluted with water and darken with age during storage.

During preparation of a stabilized liquid smoke composition, the addition of an inorganic salt, and an inorganic mineral acid, especially phosphoric acid, to a liquid smoke composition causes tar to precipitate from the resulting mixture. The tar is allowed to settle from the aqueous phase, and the aqueous phase is separated from the tar to provide a stabilized liquid smoke composition. Over time, a small amount of additional insoluble tar may separate from the stabilized liquid smoke composition, but the stabilized liquid smoke composition does not become turbid or dark. Accordingly, the stabilized liquid smoke composition is essentially free of dissolved tars, i.e., the % T (at 590 nm) decreases from an initial value greater than about 95.5% to a minimum value of about 92% after 8 weeks storage at 32° C.

The feature of being essentially free of dissolved tars is important because water dilution of a composition containing dissolved tars results in a fine tar precipitate. The fine tar precipitate causes the diluted solution to appear turbid. This fine tar precipitate may not adversely affect meat or other foodstuffs, but does adversely affect application equipment, such as by clogging nozzles and filters and building up on casing peelers, thereby slowing production and increasing costs. The present stabilized liquid smoke compositions are essentially free of dissolved tars, and, therefore, neither form a fine tar precipitate when diluted with water nor adversely affect application equipment.

As prepared, the stabilized liquid smoke compositions typically have a pH of about 2 to about 2.5. If desired for a particular application, the pH of the stabilized liquid smoke composition can be adjusted, for example with sodium hydroxide, to a pH of up to about 6. The stabilized liquid smoke compositions therefore can have a pH of about 2 to about 6, and preferably about 2 to about 4. The low pH stabilized liquid smoke compositions, i.e., pH about 2 to pH about 2.5, have a titratable acidity of about 6% to about 16%. The titratable acidity of a stabilized liquid smoke composition is a combination of the inorganic mineral acid and the organic acids present in the liquid smoke composition.

The following examples illustrate nonlimiting examples of stabilized, high ionic strength liquid smoke compositions of the present invention. The examples show that the stabilized compositions maintain a high % T, even after storage for twelve weeks without refrigeration, i.e., at 32° C. In contrast, prior art tar-depleted liquid smoke compositions require refrigerated storage to retard dark color formation. The tar-depleted liquid smoke compositions nevertheless darken during storage and also demonstrate the disadvantage of tar precipitation after dilution with water.

In the following examples, the percent of organic compounds present in a stabilized liquid smoke is expressed as the product of the volume percent of liquid smoke composition in the stabilized liquid smoke composition and the Brix of the liquid smoke composition. In the preparation of a stabilized liquid smoke composition, a portion of the organic compounds precipitate as a tar, thereby reducing the percent by weight of organic compounds in the stabilized liquid smoke composition. Tests have shown that about 7.3% by weight of the organic compounds are precipitated from the composition. The following table correlates the percent of organic compounds used in preparing a stabilized liquid smoke composition to the weight % of organic compounds in the stabilized liquid smoke composition.

TABLE 1

| Percent Organic Compounds [a] | Weight % Organic Compounds [b] |
|---|---|
| 9% | 8.3% |
| 12% | 11.1% |
| 15% | 13.9% |
| 18% | 16.7% |
| 21% | 19.5% |
| 24% | 22.3% |
| 27% | 25.0% |
| 30% | 27.8% |

[a] calculated as volume % of liquid smoke composition times Brix of the liquid smoke composition, e.g., if a stabilized liquid smoke composition contains 50% by volume of a 30 Brix liquid smoke composition, the stabilized liquid smoke composition contains 15% organic compounds; and
[b] adjusted value for weight % organic compounds in a stabilized liquid smoke composition reflecting the amount of tar formed and precipitated from the composition, e.g., 15% organic compounds is about 13.9% weight % organic compounds.

EXAMPLE 1

Stabilized Liquid Smoke Composition

This example illustrates the preparation of a stabilized liquid smoke composition having a storage stable percent transmittance (% T) at 590 nm. An aqueous solution containing 12.75% by weight phosphoric acid, and adjusted to a pH of about 2.5 using 50% aqueous sodium hydroxide, first was prepared. This acid solution was added, in different amounts, to a fast pyrolysis liquid smoke composition. The resulting phosphoric acid and liquid smoke composition mixture was admixed for about 15 minutes. The phosphoric acid caused tar to precipitate from the mixture. The mixture then was allowed to sit overnight to permit insoluble tar to separate from the aqueous phase, and the aqueous phase was isolated from the tar. One milliliter (ml) of the aqueous phase was added to a 10 ml volumetric flask, which then was filled to volume with distilled water. No tar precipitate was observed, i.e., the diluted solution was clear with no evidence of turbidity. The percent transmittance of the resulting solution was determined at 590 nanometers (nm). To measure for absorbance, 0.1 gram (g) of the stabilized liquid smoke composition, i.e., the aqueous phase, was weighed into a 50 ml volumetric flask, and the flask was filled to volume with methanol. Absorbance was read at 340 nm. Storage of the composition samples was at 32° C.

|  | Sample 1 [3] | Sample 2 | Sample 3 |
|---|---|---|---|
| Liquid Smoke Composition [1] | 70 | 60 | 40 |
| Phosphoric Acid Solution [2] | 30 | 40 | 60 |
| Organic content [4] | 21 | 18 | 12 |
| Org/Inorg [5] | 3.83 | 2.47 | 1.10 |
| Log (O/I) [6] | .583 | .393 | .041 |

[1] SELECT 23, a commercial, fast pyrolysis liquid smoke composition of about 30 brix, available from Red Arrow Products Co., Inc., Manitowoc, WI, made in accordance with U.S. Pat. No. 4,876,108;
[2] a 12.75% by weight food grade phosphoric acid solution, neutralized to pH 2.5 with 50% aqueous sodium hydroxide;
[3] parts by volume;
[4] organic compounds in the composition calculated as volume % of SELECT 23 times brix of the SELECT 23;
[5] weight ratio of organic compounds to inorganic compounds (phosphoric acid plus sodium hydroxide) in the composition; and
[6] log of the org/inorg ratio.

|  | Sample 1 | Sample 2 | Sample 3 |
|---|---|---|---|
| Initial % T | 73.7 | 93.9 | 97.7 |
| Week 1 % T | 65.4 | 92.8 | 97.6 |
| Week 2 % T | 52.8 | 91.8 | 97.0 |
| Week 4 % T | 61.3 | 88.7 | 96.6 |
| Week 5 % T | 59.6 | 86.5 | 94.7 |
| Week 7 % T | 61.7 | 85.9 | 95.9 |
| Week 8 % T | 58.2 | 89.2 | 95.0 |
| Absorbance (2 weeks) | 0.273 | 0.250 | 0.123 |
| Absorbance (8 weeks) | 0.249 | 0.222 | 0.107 |

The light transmittance data show that Sample 1 exhibited a poor initial % T compared to Samples 2 and 3. The data also show that the % T for Sample 1 decreased more rapidly than Samples 2 and 3. In particular, Sample 1 had an unacceptable initial % T that decreased rapidly. Sample 2 had an improved initial % T, and near the acceptable minimum initial % T of about 95.5%, and minimum of about 92% after 8 weeks storage at 32° C. Sample 3 had an acceptable initial % T of 97.7%, and an acceptable % T after eight weeks storage at 32° C. of 95.0%.

In order to determine the relationship between the organic compound content in the composition and the organic compound-to-inorganic compound ratio that provides a stabilized liquid smoke solution, a series of tests using different concentrations of organic compounds were performed. The results are summarized in Example 2.

EXAMPLE 2

Various liquid smoke compositions containing 9% to 30% organic compounds determined as volume % of liquid smoke composition times the brix of the liquid smoke composition, and having different organic/inorganic ratios, were prepared as set forth in Example 1. Each liquid smoke composition then was tested for initial % T at 590 nm. The results are summarized below.

| Sample No. | Organic Content [4] (% by weight) | Liquid Smoke [1, 3] | Water [3] | Phosphoric Acid [3, 8] | Sodium chloride [7] | Org/Inorg. [5, 9] | Initial % T |
|---|---|---|---|---|---|---|---|
| 1 | 9% | 30% | 70% | — | — | — | 88.9 |
| 2 | 9% | 30% | 70% | — | 0.05% | 180 | 95.5 |
| 3 | 9% | 30% | 70% | — | 0.1% | 90 | 96.6 |
| 4 | 9% | 30% | 70% | — | 0.25% | 48 | 96.6 |
| 5 | 9% | 30% | 70% | — | 0.5% | 24 | 97.0 |
| 6 | 9% | 30% | 70% | — | 1.0% | 9.00 | 97.0 |
| 7 | 9% | 30% | 70% | — | 1.12% | 8.04 | 96.9 |
| 8 | 9% | 30% | 70% | — | 1.4% | 6.43 | 96.5 |
| 9 | 9% | 30% | 70% | — | 1.5% | 6.00 | 96.8 |
| 10 | 9% | 30% | 70% | 1.2 | — | 5.84 | 96.6 |
| 11 | 9% | 30% | 70% | 1.2 | 1% | 3.54 | 97.2 |
| 12 | 9% | 30% | 70% | 1.2 | 2% | 2.54 | 97.3 |
| 13 | 9% | 30% | 70% | 3.0 | 0.5% | 2.07 | 97.5 |
| 14 | 12% | 40% | 60% | 1.0 | 1.5% | 4.25 | 95.8 |
| 15 | 12% | 40% | 60% | 1.0 | 2% | 3.61 | 96.6 |
| 16 | 12% | 40% | 60% | 1.0 | 3% | 2.78 | 96.6 |
| 17 | 12% | 40% | 60% | 1.0 | 4% | 2.26 | 96.9 |
| 18 | 12% | 40% | 60% | 2.6 | 2.5% | 2.04 | 97.1 |
| 19 | 15% | 50% | 50% | 0.85 | 3% | 3.67 | 87.3 |
| 20 | 15% | 50% | 50% | 0.85 | 4% | 2.94 | 96.0 |
| 21 | 15% | 50% | 50% | 0.85 | 5% | 2.46 | 96.6 |
| 22 | 18% | 60% | 40% | 0.70 | 3.5% | 4.11 | 93.3 |
| 23 | 18% | 60% | 40% | 5.1 | — | 3.53 | 95.1 |
| 24 | 18% | 60% | 40% | 0.70 | 5% | 3.06 | 95.0 |
| 25 | 18% | 60% | 40% | 2.6 | 3% | 2.55 | 96.0 |
| 26 | 21% | 70% | 30% | 3.8 | 4% | 2.25 | 94.4 |
| 27 | 21% | 70% | 30% | 8.4 | — | 1.91 | 95.7 |
| 28 | 24% | 80% | 20% | 5.6 | 3% | 2.32 | 92.7 |
| 29 | 24% | 80% | 20% | 5.6 | 6% | 1.80 | 96.4 |
| 30 | 24% | 80% | 20% | 5.6 | 9% | 1.47 | 97.3 |
| 31 | 24% | 80% | 20% | 5.6 | 12% | 1.24 | 98.0 |
| 32 | 27% | 90% | 10% | 2.8 | 10% | 2.11 | 89.7 |
| 33 | 27% | 90% | 10% | 2.8 | 11% | 1.95 | 92.1 |
| 34 | 27% | 90% | 10% | 2.8 | 12% | 1.82 | 95.3 |
| 35 | 27% | 90% | 10% | 2.8 | 13% | 1.71 | 96.0 |
| 36 | 30% | 100% | 0 | — | 15% | 2.00 | 71.0 |
| 37 | 30% | 100% | 0 | — | 20% | 1.50 | 95.4 |

[7] percent by weight;
[8] phosphoric acid neutralized to pH 2.2 with sodium hydroxide; and
[9] includes sodium hydroxide, sodium chloride, and phosphoric acid as inorganic compounds.

Samples wherein the initial % T was about 95.5% were analyzed to obtain a relationship between the org/inorg ratio and % organic compounds in a stabilized liquid smoke composition. In particular, the data obtained from Samples 2, 14, 20, and an extrapolation of Samples 24 and 25, 27, 29, 34, and 37 were plotted as log (O/I), i.e., the logarithm of the org/inorg ratio vs. total % organic content, as determined by volume % liquid smoke composition times brix of the liquid smoke composition. The data points are plotted in FIG. 1, and the data points were found to most closely satisfy the relationship:

$$y = 0.23x + 0.85,$$

wherein y is the logarithm of the org/inorg ratio, and x is the percent of organic compounds in the stabilized liquid smoke composition. The straight line in FIG. 1 is a graph of the above equation. It has been found that compositions falling on or below the straight line plotted in FIG. 1 are stabilized liquid smoke compositions of the present invention, i.e., have an initial % T at 590 nm of at least about 95.5%.

EXAMPLE 3
Stabilized Liquid Smoke Composition

This example illustrates the preparation of a stabilized liquid smoke composition having a storage stable % T. Preparation of the phosphoric acid and liquid smoke composition mixture was performed identically to Example 1. Then, a different amount of sodium chloride was added to individual portions of the mixture. Each resulting mixture was stirred until the salt was dissolved. Each mixture then was allowed to stand undisturbed to permit the precipitated tar to settle from the aqueous phase. The aqueous phase then was isolated from the tar. The resulting aqueous phases were tested for % T and absorbance as set forth in Example 1. Storage of the samples was at 32° C.

|  | Sample 1 | Sample 2 | Sample 3 |
| --- | --- | --- | --- |
| Liquid Smoke Composition [1] | 40 | 40 | 40 |
| Phosphoric Acid Solution [2] | 60 | 60 | 60 |
| Sodium Chloride | 1 | 3 | 5 |
| Org/Inorg [5] | 1.00 | 0.86 | 0.75 |
| Initial % T | 97.9 | 98.0 | 98.5 |
| Week 1 % T | 98.0 | 98.0 | 98.5 |
| Week 2 % T | 97.6 | 97.8 | 98.2 |
| Week 4 % T | 97.3 | 96.4 | 98.1 |
| Week 5 % T | 96.0 | 96.1 | 96.9 |
| Week 7 % T | 96.3 | 96.3 | 97.0 |
| Week 8 % T | 95.5 | 95.9 | 96.6 |
| Absorbance (2 weeks) | 0.114 | 0.112 | 0.106 |
| Absorbance (8 weeks) | 0.108 | 0.103 | 0.092 |

Each of the stabilized liquid smoke compositions of Samples 1–3 had an organic to inorganic weight ratio sufficient to achieve an initial % T of at least 95.5% and had a total amount of organic compounds of less than 20%. Each sample also had a % T after 8 weeks storage at 32° C. greater than about 92%. Samples 1–3 also each had an absorbance below 0.20. The compositions of Samples 1–3 remained light in color during storage, and did not form a precipitate, i.e., were not turbid, when diluted with water.

EXAMPLE 4

Samples 1–3 were prepared by the methods set forth in Examples 1 and 3 and tested by the methods set forth in Example 1.

|  | Sample 1 [3] | Sample 2 | Sample 3 |
| --- | --- | --- | --- |
| Liquid Smoke Composition [1] | 50 | 60 | 70 |
| Phosphoric Acid Solution [2] | 50 | 40 | 30 |

-continued

|  | Sample 1 [3] | Sample 2 | Sample 3 |
| --- | --- | --- | --- |
| Sodium Chloride | 3 | 3 | 3 |
| Org/Inorg [5] | 1.24 | 1.75 | 2.48 |
| Initial % T | 98.0 | 96.5 | 93.7 |
| 2 week % T | 97.7 | 94.5 | 93.7 |
| 4 week % T | 96.9 | 95.1 | 86.2 |
| 6 week % T | 96.1 | 94.0 | 71.2 |
| 8 week % T | 96.6 | 94.5 | 81.2 |
| Absorbance (Initial) | 0.130 | 0.198 | 0.260 |
| Absorbance (22 weeks) | 0.122 | 0.178 | 0.209 |

Samples 1 and 2 are stabilized compositions of the present invention having an initial % T greater than about 95.5%, and a % T after 8 weeks storage at 32° C. of at least about 92%. Samples 1 and 2 each have an organic-to-inorganic weight ratio of less than 2:1, and contain about 15% and about 18%, respectively, of organic compounds. Sample 3 has an organic-to-inorganic weight ratio well in excess of about 2 to 1 and contains about 21% of organic compounds. Sample 3 had an unacceptably low initial % T that rapidly decreased during storage. Sample 3 also had an unacceptably high initial absorbance of greater than 0.25. Samples 1 and 2 remained light in color during storage and did not form a precipitate when diluted with water, either initially or after 22 weeks of storage. Sample 3 darkened during storage and formed a turbid solution when diluted with water after 8 weeks storage.

EXAMPLE 5

This example summarizes tests performed using acids other than phosphoric acid to prepare a stabilized liquid smoke composition. In this test, aqueous solutions containing different acids were prepared. The aqueous acid solutions then were added to liquid smoke compositions as set forth in Examples 1 and 3. The resulting compositions were tested as set forth in Example 1.

|  | Sample 1 [3] | Sample 2 | Sample 3 |
| --- | --- | --- | --- |
| Liquid Smoke Composition [1] | 40 | 60 | 40 |
| Acid Solution | 60 [10] | 40 [10] | 60 [11] |
| Sodium Chloride | 3 | 3 | 3 |
| Org/Inorg [5] | 7.00 | 8.00 | 7.00 |
| Initial % T | 81.8 | 32.3 | 89.3 |

|  | Sample 4 | Sample 5 | Sample 6 |
| --- | --- | --- | --- |
| Liquid Smoke Composition [1] | 60 | 40 | 60 |
| Acid Solution | 40 [11] | 60 [12] | 40 [12] |
| Sodium Chloride | 3 | 3 | 3 |
| Org/Inorg [5] | 8.00 | 1.00 | 2.00 |
| Initial % T | 37.8 | 96.1 | 90.1 |

|  | Sample 7 | Sample 8 | Sample 9 |
| --- | --- | --- | --- |
| Liquid Smoke Composition [1] | 40 | 60 | 40 |
| Acid Solution | 60 [13] | 40 [13] | 60 [14] |
| Sodium Chloride | 3 | 3 | 3 |

-continued

|  | Sample 7 | Sample 8 | Sample 9 |
|---|---|---|---|
| Org/Inorg [5] | 1.00 | 2.00 | 4.33 |
| Initial % T | 95.9 | 81.7 | 93.9 |

[10] 15% by weight citric Acid;
[11] 15% by weight malic acid;
[12] 15% by weight sulfuric acid;
[13] 15% by weight hydrochloric acid; and
[14] 15% by weight adipic acid.

The samples of Example 5 show that organic acids are not suitable in the preparation of a stabilized liquid smoke composition because of an unacceptable low initial % T (i.e., Samples 1–4 and 9). In addition, inorganic mineral acids different from phosphoric acid are useful, but the weight ratio of organic compounds to inorganic compounds in the stabilized liquid smoke composition is about 1:1, or less (see Samples 5 and 7 compared to Samples 6 and 8).

EXAMPLE 6

Six samples were prepared and tested for % T, as set forth in Examples 1 and 3. In this example, the amount of sodium chloride was varied, and the weight percent of acetic acid (i.e., titratable acidity) in the liquid smoke composition was varied. The six samples were stored at 32° C.

|  | Sample | | | | | |
|---|---|---|---|---|---|---|
|  | 1[3] | 2 | 3 | 4 | 5 | 6 |
| Liquid Smoke Composition[1] | 60 | 60 | 60 | 60 | 60 | 60 |
| Phosphoric Acid Solution[2] | 40 | 15 | 40 | 15 | 40 | 15 |
| Sodium Chloride | 3 | 3 | 6 | 6 | 8 | 8 |
| Water | — | 25 | — | 25 | — | 25 |
| Org/Inorg[5] | 1.75 | 3.13 | 1.35 | 2.06 | 1.18 | 1.68 |
| Total Titratable Acidity[15] | 10 | 6 | 10 | 6 | 10 | 6 |
| Initial % T | 97.3 | 94.1 | 97.9 | 96.6 | 98.1 | 97.2 |
| 2 week % T | 94.3 | 91.6 | 95.9 | 94.1 | 96.0 | 95.1 |
| 4 week % T | — | 88.9 | 95.6 | 94.2 | 96.2 | 95.0 |
| 6 week % T | 94.2 | 90.5 | 95.4 | 93.2 | 95.0 | 94.4 |
| 8 week % T | 93.7 | 88.2 | 95.4 | 93.0 | 95.0 | 94.0 |
| 12 week % T | 93.1 | 83.7 | 94.4 | 91.8 | 94.9 | 93.7 |
| Absorbance | 0.195 | 0.256 | 0.164 | 0.221 | 0.162 | 0.200 |
| Absorbance (8 weeks) | 0.177 | 0.216 | 0.136 | 0.174 | 0.153 | 0.161 |
| Absorbance (12 weeks) | 0.164 | 0.204 | 0.171 | 0.158 | 0.136 | 0.178 |

[15] total titratable acidity calculated as % acetic acid, by weight, includes organic acids in the liquid smoke composition and the phosphoric acid.

The data of Example 6 again show that the logarithm of an organic-to-inorganic weight ratio falling on or below the straight line plotted in FIG. 1 provides a liquid smoke composition that is stable in accordance with the present invention, e.g., Sample 2 falls above the line of FIG. 1 and is unstable and Samples 1 and 3–6 fall below the line and are stable. Sample 2 has a log (org/inorg) of 0.496, a total amount of organics of 18% by weight, an initial % T of 94.1, and at % T after 12 weeks storage at 32° C. of 83.7%. Plotting the data point of Sample 2 on FIG. 1 falls above the straight line plot. The samples of Example 6 show that if the initial % T is about 95.5% or greater, then the liquid smoke composition is stabilized, i.e., has a % T after 8 weeks of about 92% or greater. Such samples did not become turbid during storage because of a sufficient organic-to-inorganic weight ratio. All samples of Example 5 contained about 18% organic components. It also was observed that stabilized liquid smoke compositions typically have an initial absorbance of 0.25 or less, and especially 0.2 or less, i.e., compare Samples 1, 3, 5, and 6 to Samples 2 and 4.

EXAMPLE 7

The six samples of Example 6 were prepared and tested as set forth in Examples 1 and 3. In this example, the amount of phosphoric acid was varied, and the amount and type of liquid smoke composition was varied. The six samples were stored at 32° C. Samples 1–6 also show that different slow pyrolysis-type liquid smoke compositions can be used to prepare a stabilized liquid smoke composition of the present invention.

|  | Sample | | | | | |
|---|---|---|---|---|---|---|
|  | 1[3] | 2 | 3 | 4 | 5 | 6 |
| Liquid Smoke Composition[1] | 40[16] | 50[16] | 60[16] | 40[17] | 50[17] | 60[17] |
| Phosphoric Acid Solution[2] | 60 | 50 | 40 | 60 | 50 | 40 |
| Sodium Chloride | 3 | 3 | 3 | 3 | 3 | 3 |
| Org/Inorg[5] | 0.83 | 1.18 | 1.65 | 0.92 | 1.32 | 1.85 |
| Initial % T | 99.0 | 98.5 | 97.6 | 98.8 | 98.1 | 96.0 |
| 2 week % T | 98.0 | 96.0 | 95.6 | 97.1 | 97.1 | 92.0 |
| 4 week % T | 97.9 | 95.8 | 95.5 | 97.1 | 96.9 | 88.6 |
| 6 week % T | 97.5 | 95.0 | 94.4 | 96.5 | 96.5 | 88.2 |
| 8 week % T | 97.4 | 95.0 | 94.8 | 96.8 | 96.3 | 91.4 |
| 12 week % T | 96.9 | 94.0 | 93.2 | 96.2 | 95.8 | 87.5 |

-continued

|  | Sample | | | | | |
|---|---|---|---|---|---|---|
|  | 1[3] | 2 | 3 | 4 | 5 | 6 |
| Absorbance | 0.092 | 0.140 | 0.164 | 0.122 | 0.143 | 0.196 |
| Absorbance (8 weeks) | 0.081 | 0.136 | 0.155 | 0.113 | 0.113 | 0.199 |
| Absorbance (12 weeks) | 0.087 | 0.127 | 0.163 | 0.116 | 0.115 | 0.191 |

[16] CHARSOL® C-10, a slow pyrolysis liquid smoke composition containing about 11% titratable acidity (as acetic acid) available from Red Arrow Products Co., Ltd., Manitowoc, WI; and
[17] a slow pyrolysis-type liquid smoke composition of about 30 brix containing about 11% by weight titratable acidity (as acetic acid) available from Hickory Specialties, Brentwood, TN, as CODE 10 Liquid Smoke.

Each of samples 1–5 was a stabilized liquid smoke composition of the present invention. These samples contained a maximum of 18% organic compounds (Samples 3 and 6), and are prepared from different slow pyrolysis liquid smoke compositions (Samples 1–3 compared to Samples 4–6). Each Sample 1–5 had an initial % T of about 95.5% or greater, and a % T after 8 weeks storage at 32° C. of about 92% or greater. Each Sample 1–5 also had an absorbance of 0.25 or less, both initially and after storage. After dilution with water, no tar precipitate formed, and the diluted samples remained clear.

Sample 6 had a relatively fast drop in % T during storage, possibly due to a combination of a relatively high total organic content (i.e., about 18%), a relatively high organic compound to inorganic compound weight ratio, and a relatively high titratable acidity (i.e., about 11%). Accordingly, it is preferred to use a liquid smoke composition having a relatively low titratable acidity when the total organic content of the composition is relatively high.

EXAMPLE 8

A stabilized liquid smoke composition containing 50 volume parts SELECT 23 liquid smoke composition, 50 volume parts of a 12.75% by weight phosphoric acid solution, and 3 weight parts sodium chloride was prepared and tested, as set forth in Examples 1 and 3. The composition had an organic-to-inorganic weight ratio of 1.24. The composition was stored for twelve weeks at 32° C. The following data shows that the composition was very stable, and did not darken with age or form a precipitate after dilution with water.

|  | % T | Absorbance |
|---|---|---|
| Initial | 97.5 | 0.117 |
| Week 2 | 97.6 | 0.127 |
| Week 4 | 97.2 | 0.105 |
| Week 6 | 97.6 | 0.109 |
| Week 8 | 97.6 | 0.121 |
| Week 12 | 97.3 | Not available |

EXAMPLE 9 (Comparative)

The samples of Example 9 are comparative tar-depleted liquid smoke compositions. Sample 1 was prepared in accordance with U.S. Pat. No. 4,431,033 by extracting a slow pyrolysis liquid smoke composition (CHARSOL® C-10, available from Red Arrow Product Co., Inc., Manitowoc, Wis.), with methylene chloride on a 1:1 volume basis. Sample 2 was prepared in accordance with U.S. Pat. No. 4,592,918 by neutralizing CHARSOL® C-10 with 50% aqueous sodium hydroxide to pH 5.5. The samples were stored at 32° C. and tested as set forth in Example 1.

|  | Sample 1 | | Sample 2 | |
|---|---|---|---|---|
|  | % T | Absorbance | % T | Absorbance |
| Initial | 71.4 | 0.151 | 89.4 | 0.343 |
| Week 2 | 40.5 | 0.167 | 73.0 | 0.412 |
| Week 4 | 27.8 | 0.163 | 70.5 | 0.399 |
| Week 6 | 37.7 | 0.187 | 68.0 | 0.391 |
| Week 8 | floc | 0.172 | 63.4 | 0.461 |
| Week 12 | floc | Not performed | 60.7 | Not performed |

These tar-depleted liquid smoke compositions became dark in color over time, as illustrated by the increase in absorbance value. Sample 1 also formed a tar floc during storage, as illustrated by the steep drop in % T over time and the turbidity of the composition after eight weeks of storage. The samples also formed a tar precipitate when diluted with water. The tar-depleted liquid smoke compositions therefore are not stabilized, and are substantially different from a stabilized liquid smoke composition of the present invention.

EXAMPLE 10

A stabilized liquid smoke composition containing 50 volume parts SELECT 23, 50 volume parts of a 12.75% by weight phosphoric acid solution neutralized to pH 2.25, and 2 weight parts sodium chloride was prepared (org/inorg weight ratio 1.38). The composition was allowed to sit overnight, and 1.08% by weight of the composition separated from the composition as tar. One hundred milliliter aliquots of the supernatant aqueous phase were placed in 250 ml plastic bottles and stored either at room temperature or at 32° C. for up to twelve weeks.

The following data summarizes the amount of tar that separated from the stabilized liquid smoke composition over time.

|  | Room<br>Temperature Storage | | 32° C. Storage | |
|---|---|---|---|---|
|  | | Settled<br>Tar, % | | Settled<br>Tar, % |
| Week 2 | | 0.13 | Week 2 | 0.25 |
| Week 4 | | 0.25 | Week 4 | 0.44 |
| Week 6 | | 0.29 | Week 6 | 0.51 |
| Week 8 | | 0.43 | Week 8 | 0.75 |

Both stored samples remained light in color during storage, thereby showing that tar forming during storage settles from the composition and that the composition is essentially free of dissolved tars, i.e., has a % T of at least about 92% after 8 weeks storage at 32° C. The tar that settled from the composition was intractable, and did not adversely affect the stabilized liquid smoke composition. The samples were diluted with water after eight weeks storage to provide clear solutions, i.e., free of turbidity and precipitated tar.

EXAMPLE 11

Five stabilized liquid smoke compositions containing 50 volume parts SELECT 23, 50 volume parts of a 15.4% phosphoric acid solution neutralized to pH 2.5, and various amounts of sodium chloride were prepared to determine whether an increased salt concentration can initially force more tar from the composition. The compositions were prepared, then centrifuged for about six minutes. The amount of tar forced from the composition was determined.

|  | Settled<br>Tar, % | % Increase of<br>Tar (From<br>no salt) | Org/Inorg[5] |
|---|---|---|---|
| No salt | 1.25 | | 1.48 |
| 1% NaCl | 1.63 | 22 | 1.35 |
| 3% NaCl | 1.65 | 24 | 1.14 |
| 6% NaCl | 1.90 | 34 | 0.93 |
| 8% NaCl | 2.05 | 39 | 0.83 |

The data summarized above shows that increasing the amount of salt, i.e., decreasing the organic-to-inorganic weight ratio, initially forced more tar from the stabilized liquid salt composition.

EXAMPLE 12

In this example, twenty-four samples were prepared as set forth in Examples 1 and 3. The samples contained 50, 55, or 60 volume parts SELECT 23, had 6% or 10% titratable acidity (expressed as % by weight acetic acid), and contained either 1, 3, 6, or 8 weight parts sodium chloride. The samples were stored at 32° C. for twelve weeks, and tested for % T and absorbance as set forth in Example 1.

| Sample | Composition[18] | Org/Inorg[5] |
|---|---|---|
| 1 | 50/10/1 | 1.35 |
| 2 | 50/10/3 | 1.14 |
| 3 | 50/10/6 | 0.93 |
| 4 | 50/10/8 | 0.83 |
| 5 | 50/6/1 | 2.96 |
| 6 | 50/6/3 | 2.12 |
| 7 | 50/6/6 | 1.49 |
| 8 | 50/6/8 | 1.24 |
| 9 | 55/10/1 | 1.48 |
| 10 | 55/10/3 | 1.25 |
| 11 | 55/10/6 | 1.02 |
| 12 | 55/10/8 | 0.91 |
| 13 | 55/6/1 | 3.26 |
| 14 | 55/6/3 | 2.34 |
| 15 | 55/6/6 | 1.64 |
| 16 | 55/6/8 | 1.37 |
| 17 | 60/10/1 | 1.61 |
| 18 | 60/10/3 | 1.37 |
| 19 | 60/10/6 | 1.11 |
| 20 | 60/10/8 | 0.99 |
| 21 | 60/6/1 | 3.56 |
| 22 | 60/6/3 | 2.55 |
| 23 | 60/6/6 | 1.79 |
| 24 | 60/6/8 | 1.28 |

[18] volume parts of SELECT 23/titratable acidity/weight parts of sodium chloride.

| Sample | % T/A<br>initial | % T/A<br>week 2 | % T/A<br>week 4 | % T/A<br>week 6 | % T/A<br>week 8 | % T/A<br>week 12 |
|---|---|---|---|---|---|---|
| 1 | 97.1/0.144 | 96.4/0.130 | 96.2/0.127 | 96.0/0.133 | 95.6/NA | 93.8/0.135 |
| 2 | 97.7/0.150 | 97.0/0.122 | 96.7/0.117 | 96.6/0.129 | 95.8/NA | 95.3/0.120 |
| 3 | 98.2/0.110 | 96.0/0.109 | 97.4/0.114 | 97.2/0.086 | 96.6/NA | 95.0/0.101 |
| 4 | 98.2/0.107 | 98.0/0.109 | 97.8/0.110 | 97.4/0.083 | 96.7/NA | 96.3/0.081 |
| 5 | 95.9/0.177 | 94.9/0.187 | 92.5/0.156 | 93.9/0.155 | 92.7/NA | 89.8/0.143 |
| 6 | 96.9/0.155 | 96.0/0.155 | 95.6/0.137 | 95.4/0.136 | 94.7/NA | 94.0/0.131 |
| 7 | 97.2/0.147 | 96.3/0.174 | 96.0/0.136 | 95.7/0.122 | 94.8/NA | 94.1/0.118 |
| 8 | 97.8/0.134 | 97.2/0.125 | 96.9/0.120 | 96.7/0.104 | 95.8/NA | 95.6/0.100 |
| 9 | 96.9/0.159 | 96.1/0.146 | 95.7/0.129 | 95.5/0.128 | 95.8/NA | 94.3/0.111 |
| 10 | 97.1/0.166 | 96.0/0.149 | 96.2/0.125 | 95.9/0.134 | 94.7/NA | 94.6/0.139 |
| 11 | 97.7/0.142 | 96.7/0.121 | 96.9/0.113 | 96.6/0.108 | 95.1/NA | 95.3/0.115 |
| 12 | 98.0/0.118 | 96.0/0.119 | 97.3/0.115 | 97.1/0.111 | 95.8/NA | 96.2/0.105 |
| 13 | 96.3/0.170 | 94.7/0.181 | 94.7/0.156 | 94.5/0.194 | 96.2/NA | 93.6/0.141 |
| 14 | 96.7/0.167 | 95.4/0.164 | 95.4/0.157 | 95.3/0.162 | 93.7/NA | 94.5/0.137 |
| 15 | 96.9/0.161 | 95.5/0.173 | 95.6/0.149 | 95.4/0.156 | 94.3/NA | 94.5/0.141 |
| 16 | 97.8/0.139 | 97.0/0.128 | 96.9/0.111 | 96.7/0.117 | 95.9/NA | 95.7/0.118 |
| 17 | 96.2/0.186 | 94.9/0.181 | 94.8/0.171 | 94.5/0.152 | 93.6/NA | 93.9/0.155 |
| 18 | 96.6/0.163 | 95.3/0.169 | 95.2/0.161 | 94.8/0.137 | 93.7/NA | 93.9/0.151 |

-continued

| Sample | % T/A initial | % T/A week 2 | % T/A week 4 | % T/A week 6 | % T/A week 8 | % T/A week 12 |
|---|---|---|---|---|---|---|
| 19 | 97.3/0.156 | 96.3/0.145 | 96.3/0.155 | 96.0/0.131 | 95.0/NA | 94.9/0.142 |
| 20 | 97.4/0.138 | 96.8/0.133 | 96.8/0.118 | 96.5/0.121 | 95.6/NA | 95.6/0.116 |
| 21 | 95.3/0.245 | 93.2/0.179 | 92.9/0.189 | 92.5/0.160 | 90.0/NA | 86.6/0.183 |
| 22 | 96.0/0.228 | 94.9/0.199 | 94.3/0.194 | 94.3/0.177 | 92.4/NN | 91.4/0.157 |
| 23 | 97.0/0.183 | 96.0/0.168 | 95.9/0.160 | 95.6/0.133 | 94.8/NA | 94.4/0.135 |
| 24 | 97.4/0.153 | 96.5/0.159 | 96.4/0.134 | 96.1/0.128 | 95.3/NA | 95.2/0.125 |

NA—not available
A—absorbance

The samples of Example 12 show that stabilized liquid compositions having an initial % T of at least 95.5% at 590 nm fall on or below the straight line plotted in FIG. 1, or, alternatively, satisfy the following relationship:

$$\log(\text{org/inorg}) \leq -0.23x + 0.85.$$

wherein x is the total organic content (i.e., % volume of liquid smoke times brix of the liquid smoke) of the composition.

EXAMPLE 13

A 15% by weight acetic acid solution was substituted for the phosphoric acid in the preparation of a stabilized liquid smoke solution. The following data shows that to achieve an initial % T of about 95.5% (Sample 4), the amount of inorganic salt in the composition is unacceptably high with respect to providing a commercial liquid smoke composition. Sample 3 shows that an organic acid cannot be substituted for the inorganic mineral acid because the minimum initial % T of about 95.5 is not attained.

| | Sample | | | | |
|---|---|---|---|---|---|
| | 1[3] | 2 | 3 | 4 | 5 |
| Liquid smoke composition[1] | 60 | 50 | 50 | 50 | 50 |
| Acetic acid solution[19] | 40 | 50 | 50 | 50 | 50 |
| Water | | | | | 50 |
| Sodium chloride | 8 | 8 | 15 | 30 | 8 |
| Org/inorg[5] | 3.00 | 2.81 | 1.50 | 0.75 | 1.88 |
| % T (initial) | 40.4 | 56.8 | 86.9 | 96.1 | 95.7 |
| Absorbance | 0.290 | 0.216 | 0.220 | 0.134 | 0.166 |

[19] a 15% by weight acetic acid solution.

EXAMPLE 14

A stabilized liquid smoke composition was prepared from 40 volume parts SELECT 23, 60 volume parts of a 12.75% by weight phosphoric acid solution neutralized to pH 2.5, and 3 weight parts sodium chloride. Then, the pH of the composition was raised to 5 by adding trisodium phosphate to the composition. The resulting composition had an organic-to-inorganic weight ratio of 0.46, and was stored at 32° C. for 23 weeks. The composition was tested for % T as set forth in Example 1.

| | % T |
|---|---|
| Initial | 95.5 |
| Week 2 | 94.1 |
| Week 4 | 94.4 |
| Week 6 | 93.4 |
| Week 8 | 93.3 |
| Week 23 | 96.2 |

The % T data shows that a stabilized liquid smoke composition of the present invention can be neutralized without adversely affecting composition properties.

EXAMPLE 15

Two samples of a stabilized liquid smoke composition of the present invention were prepared to demonstrate the effect of total titratable acidity on % T. Sample 1, having 10% total titratable acidity (organic acid and phosphoric acid, expressed as % by weight acetic acid), contained 50 volume parts SELECT 23 liquid smoke composition, 50 volume parts of a 12.75% by weight phosphoric acid solution adjusted to pH 2.2, and 2 weight parts sodium chloride (an org/inorg ratio of 1.38). Sample 2 had 6% total titratable acidity because of a lower addition of phosphoric acid, and contained 3 weight parts sodium chloride (an org/inorg ratio of 2.29). The samples were prepared and tested for % T as set forth in Examples 1 and 3, and were stored at 40° C. for 12 weeks.

| | Sample 1 | Sample 2 |
|---|---|---|
| Initial | 97.2 | 96.6 |
| Week 2 | 96.2 | 94.3 |
| Week 12 | 95.0 | 92.2 |

The % T data shows that the liquid smoke solutions were stable.

EXAMPLE 16

This example illustrates that in addition to the organic:inorganic weight ratio, the total organic content of the starting liquid smoke compositions and the titratable acidity are important with respect to providing a stabilized liquid smoke composition. In this example, a solution containing 33% volume parts of an 85% phosphoric acid solution, 17% volume parts of a 50% sodium hydroxide solution, and 50% volume parts water was used to dilute SELECT 24 and SELECT 23 liquid smoke compositions (available from Red Arrow Products Co., Inc.) to different concentrations. The concentrations of the liquid smoke compositions ranged from 40% to 100% by weight. Diluting with the higher phosphoric acid concentration resulted in an acid concentration of 16% in the final composition. At a higher phosphoric acid concentration, the % T was retained. All samples contained 3 weight parts sodium chloride.

Samples 1–5 of Example 16 show that relatively dilute stabilized liquid smoke compositions having a low total organic content (i.e., 9% in Samples 4 and 5 and 12% in Samples 1–3) can be prepared when the weight ratio of organic compounds to inorganic compounds meets the relationship set forth in Example 12.

| Sample | Liquid Smoke Composition (volume amount) | % T (initial) | Org/ Inorg[5] | % Titratable Organic Acids | % Organic Compounds | % Total Titratable Acids |
|---|---|---|---|---|---|---|
| 1 | SELECT R24 (70) | 78.1 | 2.35 | 5.8 | 31.5 | 14.4 |
| 2 | SELECT R24 (60) | 96.0 | 1.60 | 5.0 | 27.0 | 16.3 |
| 3 | SELECT R24 (50) | 98.4 | 1.10 | 4.2 | 22.5 | 18.3 |
| 4 | SELECT R24 (40) | 100 | 0.75 | 3.3 | 18.0 | 20.2 |
| 5 | SELECT R23 (100) | 73.2 | 10.0 | 6.4 | 30.0 | 6.4 |
| 6 | SELECT R23 (80) | 93.1 | 2.32 | 5.1 | 24.0 | 10.8 |
| 7 | SELECT R23 (70) | 97.7 | 1.50 | 4.5 | 21.0 | 13.0 |
| 8 | SELECT R23 (60) | 98.6 | 1.02 | 3.8 | 18.0 | 15.1 |

Samples 1–8 show that a concentrated liquid smoke composition prepared by evaporation (i.e., SELECT R24 of Samples 1–4) performs better than a nonevaporated liquid smoke composition (i.e., SELECT R23 of Samples 5–8).

Sample 7 was stored at 32° C., and tested for % T over a twelve-week period. Sample 7 was an acceptable stabilized liquid smoke composition. Sample 4 also was an acceptable stabilized liquid smoke composition.

| % T | Sample 7 |
|---|---|
| Initial | 98.6 |
| Week 2 | 98.4 |
| Week 4 | 97.7 |
| Week 6 | 97.5 |
| Week 8 | 97.5 |
| Week 12 | 92.0 |

EXAMPLE 17

In this example, stabilized liquid smoke compositions containing about 9% to about 12% total organic compounds, and having an organic-to-inorganic weight ratio of about two or less, were tested for % T, both initially and after storage, and for initial absorbance.

EXAMPLE 18

Code 10 Liquid Smoke, available from Hickory Specialties, Inc., Brentwood, Tenn., was concentrated to 45 brix, then diluted to 30 brix with water. The concentration step reduces the amount of organic acids in the liquid smoke composition. Therefore, the total titratable acidity in the diluted 30 brix liquid smoke composition was 9.2% by weight, expressed as acetic acid. A stabilized liquid smoke composition then was prepared by admixing 60 volume parts of the 30 brix liquid smoke composition and 40 volume parts of a 12.75% phosphoric acid solution. Varying amounts of sodium chloride were added to individual portions of the liquid smoke-phosphoric acid solution.

| Sample | Composition[20] | Org/- Inorg.[5] | % T (initial) | % T (2 weeks) | % T (4 weeks) | % T (6 weeks) | % T (8 weeks) | Abs. |
|---|---|---|---|---|---|---|---|---|
| 1 | 40/5/2.5 | 2.04 | 97.1 | 96.1 | 97.9 | 96.4 | 95.7 | 0.175 |
| 2 | 40/5/3 | 1.88 | 97.1 | 96.3 | 96.9 | 96.9 | 96.2 | 0.135 |
| 3 | 40/5/4 | 1.62 | 97.5 | 96.6 | 96.8 | 96.8 | 95.5 | 0.154 |
| 4 | 30/5/0.5 | 2.02 | 97.5 | 96.9 | 96.5 | 96.5 | 96.4 | 0.108 |
| 5 | 30/5/1 | 1.81 | 97.7 | 97.1 | 96.4 | 96.4 | 96.5 | 0.117 |

[20]volume parts of SELECT R23, a 30 brix liquid smoke composition/volume parts of 85% phosphoric acid solution/weight parts of sodium chloride.

| Sample | Composition[21] | Org/-Inorg.[5] | % T (initial) | % T (2 weeks) | % T (4 weeks) | % T (6 weeks) | % T (8 weeks) | Abs. |
|---|---|---|---|---|---|---|---|---|
| 1 | 60/10/0 | 2.57 | 95.8 | 90.8 | 92.3 | 94.0 | 92.4 | 0.228 |
| 2 | 60/10/1 | 2.25 | 96.5 | 94.9 | 96.5 | 94.9 | 93.8 | 0.210 |
| 3 | 60/10/1.5 | 2.12 | 96.9 | 95.8 | 98.3 | 95.2 | 94.4 | 0.169 |
| 4 | 60/10/2 | 2.00 | 97.1 | 95.3 | 99.4 | 95.5 | 95.5 | 0.196 |
| 5 | 60/10/2.5 | 1.89 | 97.3 | 96.7 | 99.6 | 95.8 | 96.4 | 0.174 |

[21] volume parts of 30 brix CODE 10/titratable acidity/sodium chloride.

Samples 1–5 show that a stabilized liquid smoke composition of the present invention can be prepared from a variety of starting liquid smoke compositions.

Many modifications and variations of the invention as hereinbefore set forth can be made without departing from the spirit and scope thereof and, therefore, only such limitations should be imposed as are indicated by the appended claims.

What is claimed is:

1. A stabilized liquid smoke composition comprising:
   (a) a liquid smoke composition derived from a pyrolysis of wood;
   (b) about 1% to about 20% by weight of an inorganic salt; and
   (c) 0% to about 12% by weight of phosphoric acid, wherein the stabilized composition contains about 8% to about 30%, by weight, organic compounds and has a weight ratio of organic compounds to inorganic compounds to satisfy a relationship $$\log (O/I) \leq -0.23x+0.85,$$

wherein (O/I) is the weight ratio of organic compounds to inorganic compounds and x is the percent of organic compounds expressed as a product of volume % of the liquid smoke composition and brix of the liquid smoke composition, and wherein the stabilized composition is essentially free of dissolved tars, has an initial % T, measured at 590 nm, of at least about 95.5%, and has a % T after eight weeks of storage at 32° C. of at least about 92%, measured at 590 nm.

2. The stabilized composition of claim 1 wherein the liquid smoke composition is at least about 20 brix.

3. The stabilized composition of claim 1 wherein the liquid smoke composition is about 20 brix to about 50 brix.

4. The stabilized composition of claim 1 wherein the liquid smoke composition has a titratable acidity of about 6% to about 16%, expressed as % by weight acetic acid.

5. The stabilized composition of claim 1 wherein the liquid smoke composition is present in an amount of about 30% to about 60%, by volume of the stabilized composition.

6. The stabilized composition of claim 1 wherein the phosphoric acid is present in an amount of about 1% to about 10%, by volume of the stabilized composition.

7. The stabilized composition of claim 1 having a pH of about 2 to about 6.

8. The stabilized composition of claim 1 wherein the inorganic salt is present in an amount of about 2% to about 15%, by weight of the stabilized composition.

9. The stabilized composition of claim 1 wherein the inorganic salt is water soluble and physiologically acceptable.

10. The stabilized composition of claim 1 wherein a cation of the inorganic salt is an alkali metal, an alkaline earth metal, or a mixture thereof, and an anion of the inorganic salt is selected from the group consisting of a halide, hydroxide, sulfate, bisulfate, phosphate, nitrate, and mixtures thereof.

11. The stabilized composition of claim 1 wherein the inorganic salt is selected from the group consisting of sodium chloride, sodium hydroxide, a sodium phosphate, potassium chloride, potassium hydroxide, a potassium phosphate, and mixtures thereof.

12. The stabilized composition of claim 1 containing about 10% to about 25%, by weight, of organic compounds.

13. The stabilized composition of claim 1 containing about 12% to about 20%, by weight, of organic compounds.

14. The stabilized composition of claim 1 having an absorbance measured at 340 nm of less than about 0.25.

15. The stabilized composition of claim 1 wherein the composition is free of a polysorbate and an antifoam.

16. The stabilized composition of claim 1 wherein dilution of one volume part of the stabilized composition with 9 volume parts of water provides a clear, nonturbid solution that is free of precipitated tar.

17. A stabilized liquid smoke composition comprising:
   (a) a liquid smoke composition derived from a pyrolysis of wood;
   (b) about 1% to about 20% by weight of an inorganic salt, wherein a cation of the inorganic salt is an alkali metal, an alkaline earth metal, or a mixture thereof, and an anion of the inorganic salt is selected from the group consisting of a halide, sulfate, bisulfate, phosphate, nitrate, and mixtures thereof, and
   (c) 0% to about 12% by weight of phosphoric acid, wherein the stabilized composition contains about 8% to about 30%, by weight, organic compounds and has a weight ratio of organic compounds to inorganic compounds to satisfy a relationship $$\log (O/I) \leq -0.23x+0.85,$$

wherein (O/I) is the weight ratio of organic compounds to inorganic compounds and x is the percent of organic compounds expressed as a product of volume % of the liquid smoke composition and brix of the liquid smoke composition, and wherein the stabilized composition is essentially free of dissolved tars.

18. The stabilized composition of claim 17 wherein the inorganic salt is selected from the group consisting of sodium chloride, a sodium phosphate, potassium chloride, potassium phosphate, and mixtures thereof.

19. A method of browning a foodstuff comprising:
   (a) applying the stabilized liquid smoke composition of claim 1 to the foodstuff in a sufficient amount to develop a consumer acceptable brown color in the foodstuff; then
   (b) heating the foodstuff at a sufficient temperature and for a sufficient time for the stabilized liquid smoke composition product to brown the foodstuff.

20. The method of claim 19 wherein the foodstuff is a meat, a meat emulsion, or a casing.

* * * * *